(12) United States Patent
Liu

(10) Patent No.: US 6,961,289 B2
(45) Date of Patent: Nov. 1, 2005

(54) DIGITAL AUDIO SIGNAL PLAYER HAVING A SIMULATED ANALOGUE RECORD

(75) Inventor: Han-Chih Liu, Tainan (TW)

(73) Assignee: Hanpin Electron Co., Ltd., Tainan (TW)

( * ) Notice: Subject to any disclaimer, the term of this patent is extended or adjusted under 35 U.S.C. 154(b) by 512 days.

(21) Appl. No.: 10/139,292

(22) Filed: May 7, 2002

(65) Prior Publication Data

US 2003/0210626 A1 Nov. 13, 2003

(51) Int. Cl.$^7$ .................................................. G11B 7/00
(52) U.S. Cl. .......................... 369/4; 369/53.18; 700/94
(58) Field of Search ............................... 700/94; 369/2, 369/4, 53.18; 381/119; 84/605

(56) References Cited

U.S. PATENT DOCUMENTS

| | | | | |
|---|---|---|---|---|
| 6,535,462 B1 | * | 3/2003 | Liu | 369/4 |
| 6,541,690 B1 | * | 4/2003 | Segers, Jr. | 84/605 |
| 6,618,329 B2 | * | 9/2003 | Liu | 369/4 |
| 6,745,091 B2 | * | 6/2004 | Liu | 700/94 |
| 6,751,167 B2 | * | 6/2004 | Yamada et al. | 369/30.19 |
| 2002/0118848 A1 | * | 8/2002 | Karpenstein | 381/119 |
| 2003/0208292 A1 | * | 11/2003 | Liu | 700/94 |

* cited by examiner

*Primary Examiner*—W. R. Young
*Assistant Examiner*—Kyung Dong Kim
(74) *Attorney, Agent, or Firm*—Rosenberg, Klein & Lee

(57) ABSTRACT

In a digital audio signal player having a simulated analogue record, a voltage dividing circuit is provided that consists of a first, and a second leads connected to a respective one of two separate wound wires of a control element; the control element can be turned to simulate an analogue record being moved by hands on the turntable for the player to play music with speed and speed changing according to movement of the control element. The microprocessor can decide that users' hands have touched the control element to complete the voltage dividing circuit, which is normally open, on detecting a voltage drop in order to make music played in the special mode. Music is played in an original normal way when the hand is removed from the control element for disappearance of the voltage drop.

1 Claim, 4 Drawing Sheets

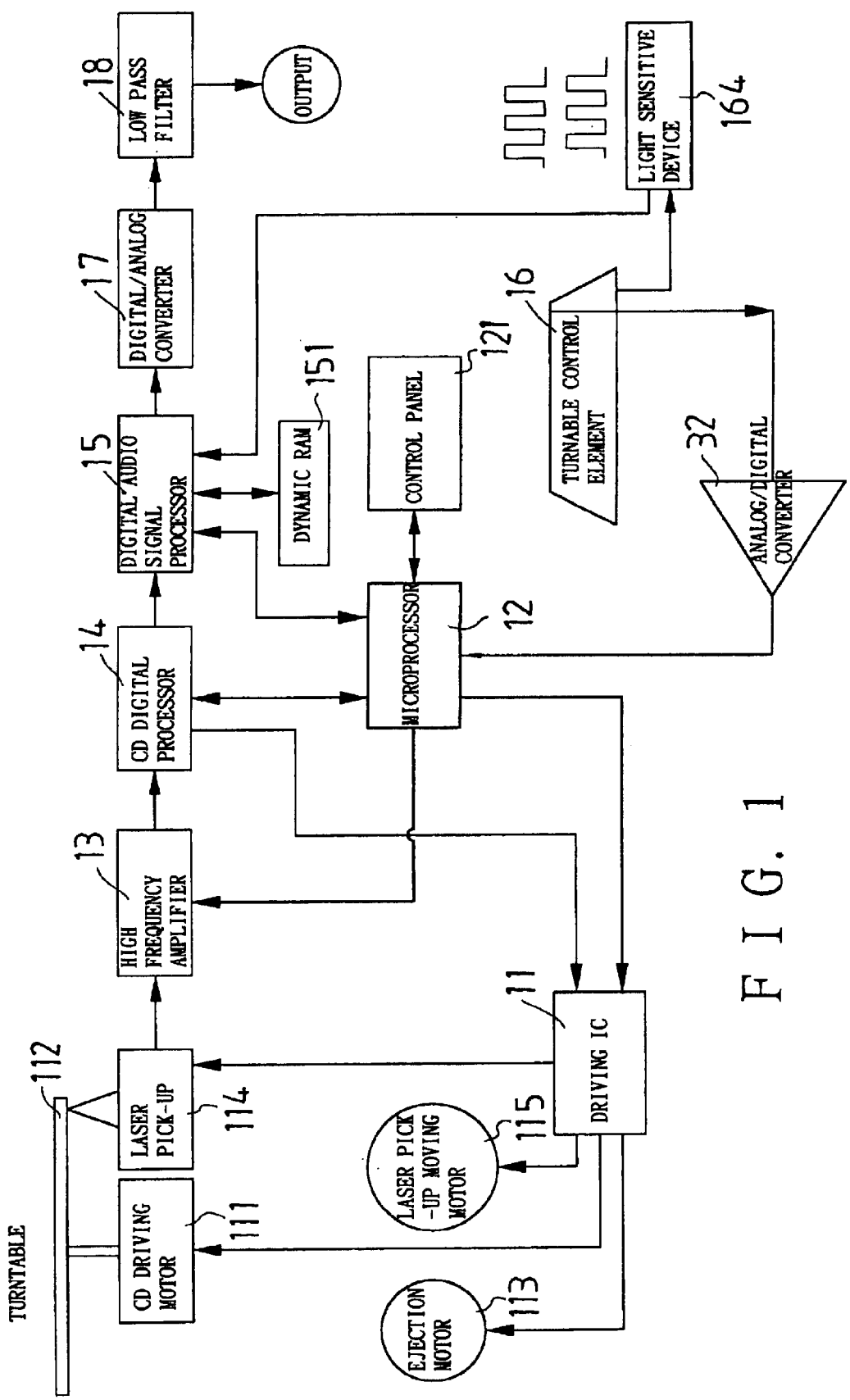
F I G. 1

DIGITAL AUDIO SIGNAL PLAYER HAVING A SIMULATED ANALOGUE RECORD

BACKGROUND OF THE INVENTION

The present invention relates to a digital audio signal player having a simulated analogue record, which is equipped with a turnable control element to be turned by a DJ to simulate an analogue record player being moved on the turntable by the DJ so that music is played with tone and speed being changed in accordance with the movement of the control element, more particularly the present invention provides a digital audio signal player having a simulated analogue record of the above mentioned nature that is not subject to interference of the ground lead of power cords thereof or magnetic interference of people and electronic equipments in the vicinity thereof In order to help increase hot and exciting atmosphere in a concert or a party such as is held in a PUB or a dancing hall, the DJ would make the music played with changing tone and speed by means of moving the analogue record on the turntable in various ways. When the DJ stoops moving the record with his hands, the record will be played on the record player in a normal way immediately.

However, a single analogue record has very limited capacity for storing music, therefore the DJ has to prepare a lot of records in each party that are likely to cause him inconvenience due to the large size and heavy weight.

In order to overcome the above disadvantages, the inventor of the present invention had disclosed a digital audio signal player having a simulated analogue record, which includes a driving IC 11, a CD driving motor 111, a turntable 112, an ejection motor 113, a laser pick-up 114, a laser pick-up moving motor 115, a microprocessor 12, a control panel 121, a high frequency amplifier 13, a CD digital processor 14, a digital audio signal processor 15, a dynamic RAM 151, a digital/analog converter 17, a turnable control element 16, an interfering signal detecting circuit 163 and a low pass filter 18.

The turntable 112 is provided for holding an analogue CD, and connected to the CD driving motor 111. The driving IC 11 is electrically connected to the CD driving motor 111, and the ejection motor 113 for activating the same to turn the turntable 112, and to eject the turntable 112 for removal of the CD respectively.

When the microprocessor 12 is activated, the same will make the high frequency amplifier 13 send out laser light, and activate the laser pick-up 114 by means of both the CD digital processor 14 and the driving IC 11. The driving IC 11 will also activate the laser pick-up moving motor 115 to move the laser pick-up 114. The laser pick-up 114 sends a signal to the CD digital processor 14 via the high frequency amplifier 13 such that the CD digital processor 14 can inform the microprocessor 12 whether the laser light has focused; if the laser light fails to focus, the microprocessor 12 will stop; if the laser light focuses successfully, the microprocessor 12 will activate the CD digital processor 14 so that the processor 14 makes the driving IC 11 activate the CD driving motor 111; the analogue CD positioned on the turntable 112 is rotated at two times the normal speed when the CD driving motor 111 is activated. And, the laser pick-up 114 reads the data of the analogue CD, and sends the data to both the microprocessor 12 and the digital audio signal processor 15 via the high frequency amplifier 13 and the CD digital processor 14; the microprocessor 12 will also make the control panel 121, which is electrically connected to it, show information about the CD; the digital audio signal processor 15 will store the data of the CD in the dynamic RAM 151.

The turnable control element 16 is made of conductive materials and formed with a round shape, and is electrically connected to the digital audio signal processor 15. The control element 16 normally sends out an original signal 161, and will send out an interfering signal 162, which is stronger than the signal 161, when the same is touched by a person's hand. A sensor (not shown) of the control element 16 will sense the rotating speed and direction of the control element 16. The interfering signal 162 will be processed by the interfering signal detecting circuit 163, and then sent to the microprocessor 12. The digital/analog converter 17 is electrically connected to both the digital audio signal processor 15 and the low pass filter 18. The microprocessor 12 can make comparison between the signal 161 and the interfering signal 162, and determine that a user has touched the control element 16 if the difference between the signal 161 and the interfering signal 162 exceeds a predetermined amount.

Thus, when a user such as a DJ rotates the turnable control element 16 with the hands, the digital audio signal processor 15 will process and sent out the data stored in the dynamic RAM 151 in a manner according to the movement of the control element 16 as sensed by the sensor, i.e. the user can control the speed and direction of the data send out from the digital audio signal processor 15. Then, the data is converted into analogue ones by means of the digital/analog converter 17. And, the analogue data are processed by the low pass filter 18, and played as music. When the user stops touching or moving the control element 16, the interfering signal 162 will disappear immediately, and accordingly the microprocessor 12 and the digital audio signal processor 15 will begin to play the music in the normal way.

Although the above player with simulated analogue record can play music with changing direction and speed to help increase hot and exciting atmosphere when a DJ rotate the turnable control element 16 to simulate a record being rotated by the hand, it is found to have a disadvantage that the interfering signal detecting circuit 163 will sense other magnetic interference that is produced by the crowd and various electronic equipments in a dancing hall, thus wrongly deciding that the control element 16 is being touched by hands.

To overcome the disadvantages of the above digital audio signal player, referring to FIG. 5, the inventor of the present invention had used another device instead of the above interfering signal detecting circuit 163 to work together with the microprocessor 12 for accurately detecting contact of hands with the control element 16. The device includes a diode 191, a buffer 192, and a high frequency alternator 19, which are connected to the microprocessor 12. And, the high frequency alternator 19 constantly sends out a high frequency signal, and is electrically connected to P pole of the diode 19, which is connected in series with the buffer 192, at the output terminal thereof. The turnable control element 16 is also connected to the P pole of the diode 191 from an output terminal thereof. Music is played in a normal way when the microprocessor 12 receives the high frequency signal in a non-reduced form; the turnable control element 16 will send an interfering signal to the diode 191 so as to reduce the high frequency signal passing through the diode 191 when touched by a hand of a person, thus making the microprocessor 12 receive a high frequency signal in a reduced form from the high frequency alternator 19 so that music is played with speed and direction changing according to the movement of the turnable control element 16 as sensed by means of a light sensitive device 164 connected to the control element 16. Thus, the microprocessor 12 is not subject to magnetic interference of people and electronic equipments to wrongly make music played with changed speed and direction when the DJ doesn't intend to. However, the above audio signal player still has a drawback that the high frequency alternator 19 thereof is subject to interference of the ground lead of the power cords thereof, thus wrongly deciding that the control element 16 is being touched by hands when it actually isn't.

SUMMARY OF THE INVENTION

It is a main object of the present invention to provide a digital audio signal player having a simulated analogue record that is not subject to interference of the ground lead of the power cord or magnetic interference of people and electronic equipments in the vicinity thereof.

In the digital audio signal player having a simulated analogue record of the present invention, a turnable control element is electrically connected to the microprocessor; the control element is provided with two separate wound wires on a surface thereof, and has a light sensitive device, which can sense rotating speed and direction of the control element. And, a voltage dividing circuit is provided that consists of both a first, and a second leads; the first lead being grounded at one end, and connected to one of the wound wires at other end; the second lead being connected to other one of the wound wires at one end, and connected to an input end of an analog/digital converter at other end; the second lead being connected to both a positive pole of a direct current and a resistor, which is in parallel with the analog/digital converter; the analog/digital converter being connected to the microprocessor at an output end thereof.

Thus, the microprocessor makes music played with direction and speed changing according to movement of the control element as sensed by the light sensitive device when deciding that a drop of voltage between the same and the positive pole has been caused by contact of a hand with the control element that completes the voltage dividing circuit. Music is played in an original way as soon as the hand is removed from the control element to break the circuit for disappearance of the voltage drop.

BRIEF DESCRIPTION OF THE DRAWINGS

The present invention will be better understood by reference to the accompanying drawings, wherein:

FIG. 1 is a block diagram of the circuit of the digital audio signal player having a simulated analogue record of the present invention.

DETAILED DESCRIPTION OF THE PREFERRED EMBODIMENTS

Figure 3:
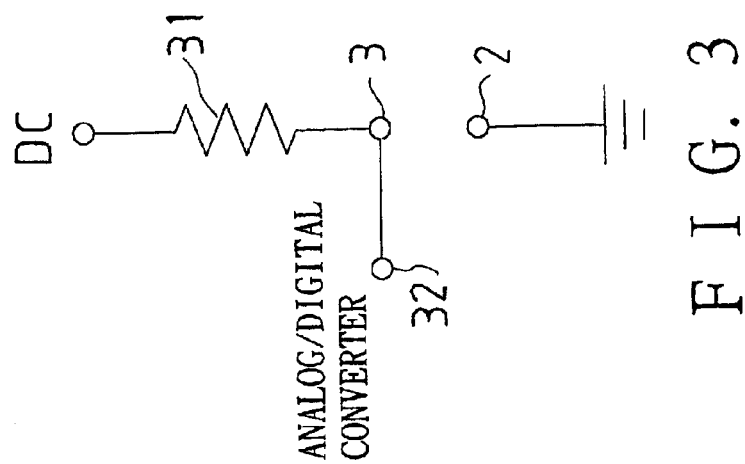
FIG. 3 is a circuit diagram of the leads of the control element of the present invention.

Referring to FIG. 1, a digital audio signal player having a simulated analogue record of the present invention includes a driving IC 11, a CD driving motor 111, a turntable 112, an ejection motor 113, a laser pick-up 114, a laser pick-up moving motor 115, a microprocessor 12, a control panel 121, a high frequency amplifier 13, a CD digital processor 14, a digital audio signal processor 15, a dynamic RAM 151, a digital/analog converter 17, a turnable control element 16, an analog/digital converter 32, and a low pass filter 18.

The turntable 112 is provided for holding an analogue CD, and connected to the CD driving motor 111. The driving IC 11 is electrically connected to the CD driving motor 111, and the ejection motor 113 for activating the same to turn the turntable 112, and to eject the turntable 112 for removal of the CD respectively.

When the microprocessor 12 is activated, the same will make the high frequency amplifier 13 send out laser light, and activate the laser pick-up 114 by means of both the CD digital processor 14 and the driving IC 11. The driving IC 11 will also activate the laser pick-up moving motor 115 to move the laser pick-up 114. The laser pick-up 114 sends a signal to the CD digital processor 14 via the high frequency amplifier 13 such that the CD digital processor 14 can inform the microprocessor 12 whether the laser light has focused; if the laser light fails to focus, the microprocessor 12 will stop; if the laser light focuses successfully, the microprocessor 12 will activate the CD digital processor 14 so that the processor 14 makes the driving IC 11 activate the CD driving motor 111; the analogue CD positioned on the turntable 112 is rotated at two times the normal speed when the CD driving motor 111 is activated. And, the laser pick-up 114 reads the data of the analogue CD, and sends the data to both the microprocessor 12 and the digital audio signal processor 15 via the high frequency amplifier 13 and the CD digital processor 14; the microprocessor 12 will also make the control panel 121, which is electrically connected to it, show information about the CD; the digital audio signal processor 15 will store the data of the CD in the dynamic RAM 151. To play music, the data of the RAM 151 is converted into analogue ones by means of the digital/analog converter 17. And, the analogue data are processed by the low pass filter 18, and played as music.

Figure 2:
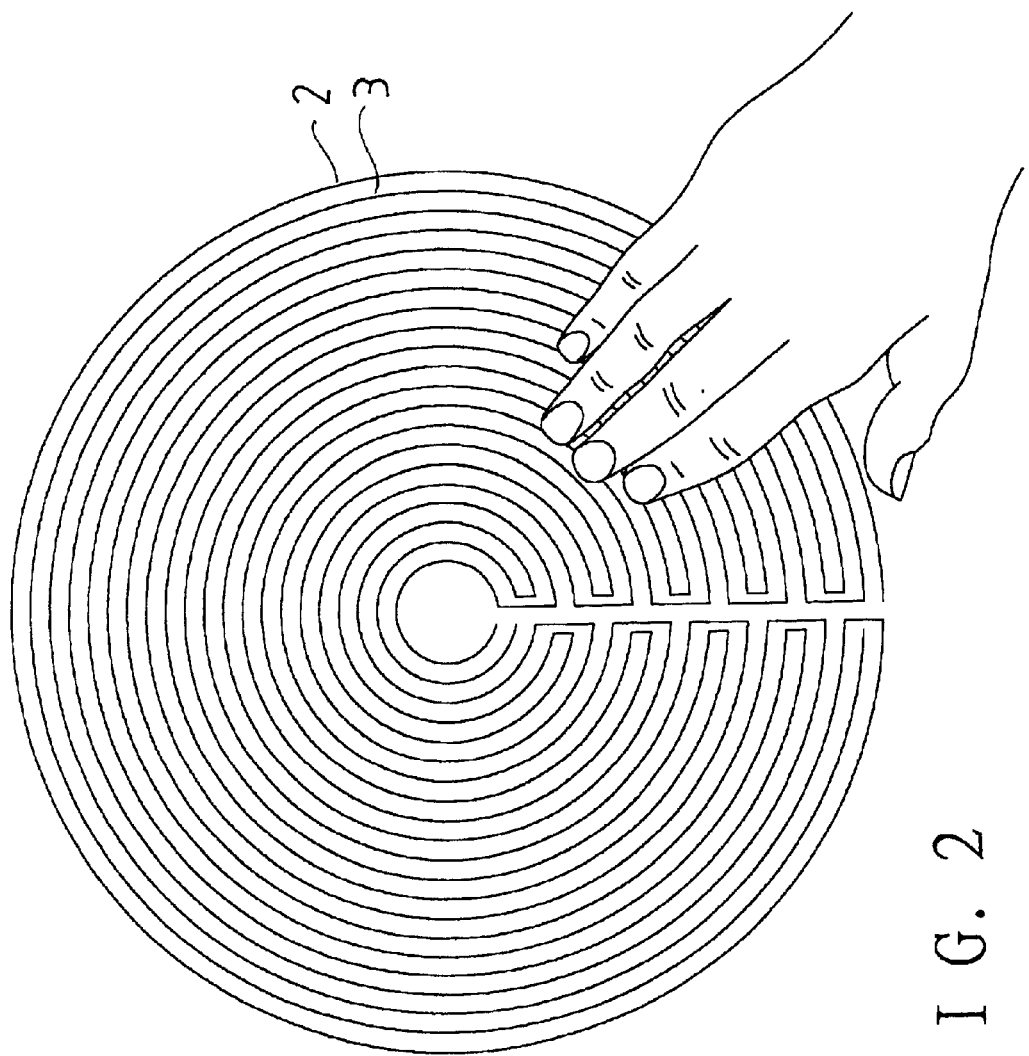
FIG. 2 is a view of the control element of the player of the present invention.
Figure 4:
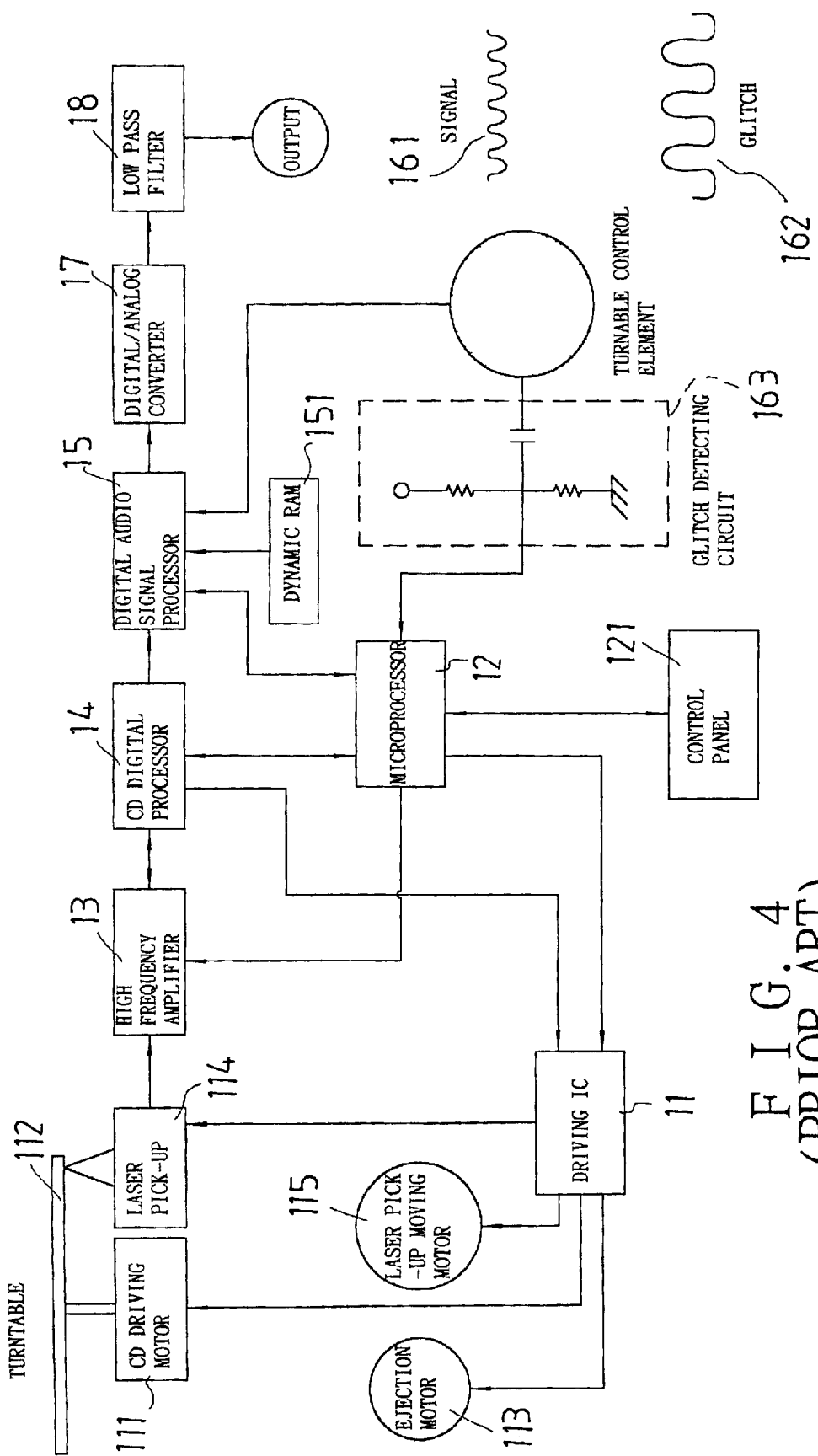
FIG. 4 is a block diagram of the circuit of the first prior digital audio signal player having a simulated analogue record as described in the Background.
Figure 5:
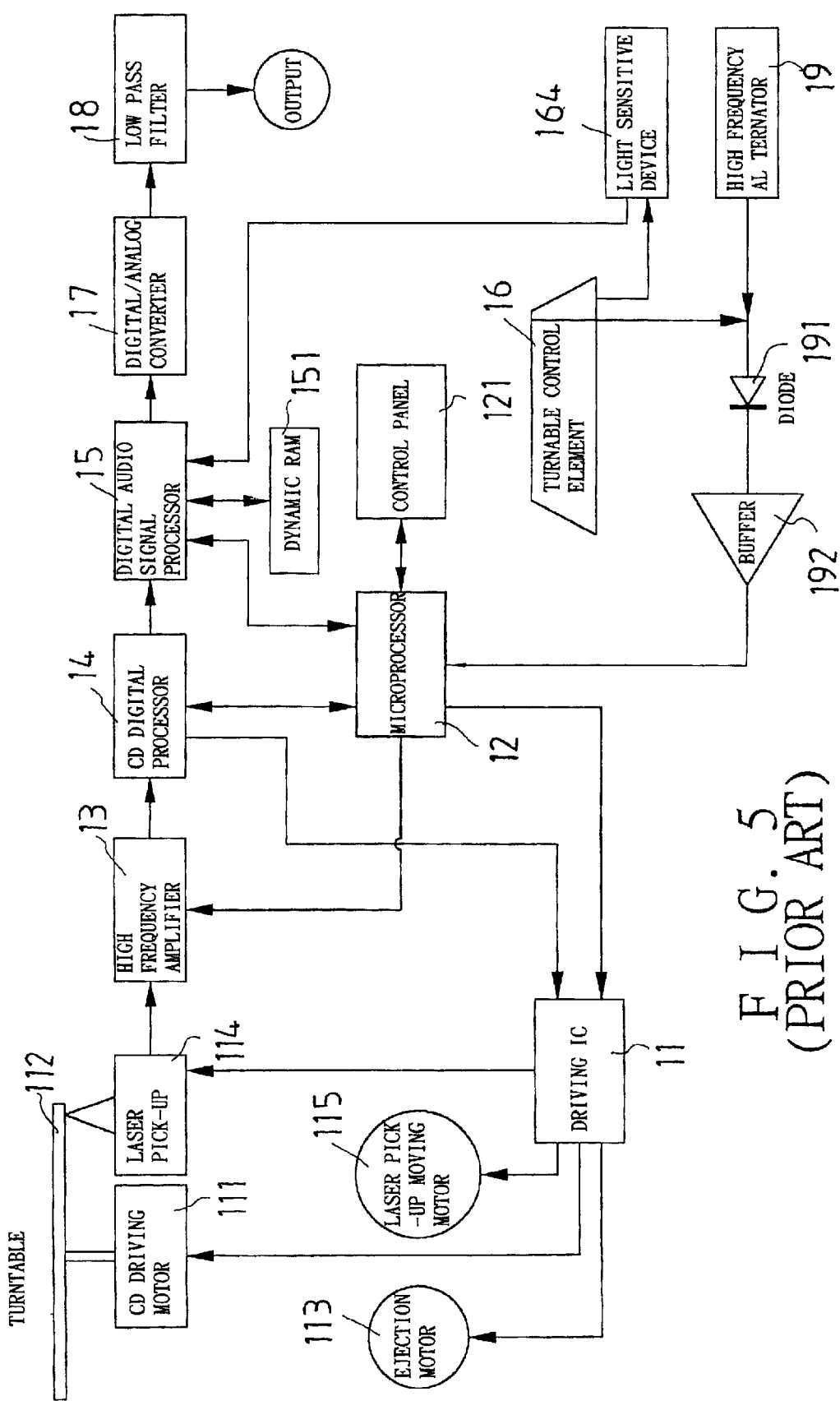
FIG. 5 is a block diagram of the circuit of the second prior digital audio signal player having a simulated analogue record.

Referring to FIG. 2, the turnable control element 16 is formed with a round shape, and is provided with two separate wound conductive lines or wires on the surface. A voltage dividing circuit is provided, which includes a first, and a second leads 2, and 3 respectively connected to the wound wires at one end. The turnable control element 16 is electrically connected to the microprocessor 12, and has a light sensitive device 164, which is electrically connected to the digital audio signal processor 15, and will sense rotating speed and direction of the control element 16. The first lead 2 is grounded at the other, while the second lead 3 is connected to an input end of an analog/digital converter 32 at the other end. The second lead 3 is connected to both a positive pole of a direct current (DC) and a resistor 31, which is in parallel with the analog/digital converter 32. The analog/digital converter 32 is electrically connected to the microprocessor 12 at an output end thereof. Because human body has electrical resistance, a voltage drop will be caused when hands of a person are put on the control element 16 to complete the circuit consisting both of the leads 2, and 3; in other words, there is a reduction of potential difference between the microprocessor 12 and the positive pole of the direct current due to the hands. The microprocessor 12 will make the digital audio signal processor 15 process data of the RAM 151 according to the movement of the control element 16 as sensed by a light sensitive device 164 electrically connected to the processor 15 when it decides that there is a contact of a person's hands with the control element 16 on detecting a voltage drop. Therefore, music can be played with direction and speed changing according to movement of the control element 16 as sensed by means of the light sensitive device. When the hands are removed from the control element 16, the above circuit becomes an open one, and the voltage drop disappears; thus, music is played in the original normal way.

From the above description, it can be easily understood that the digital audio signal player having a simulated analogue record of the present invention is not subject to interference of the ground lead of power cords or magnetic interference of people and electronic equipments in the vicinity thereof.

What is claimed is:

1. A digital audio signal player having a simulated analogue record, comprising a microprocessor;

a high frequency amplifier, the high frequency amplifier being electrically connected to the microprocessor to send out laser light when activated by the microprocessor;

a CD digital processor electrically connected to both the microprocessor and the high frequency amplifier; the CD digital processor informing the microprocessor of status of focusing of the laser light so that the microprocessor will stop working when the laser light fails to focus, and will activate a CD driving motor to rotate a CD turntable at twice a normal speed when the laser light succeeds in focusing;

a digital audio signal processor electrically connected to both the microprocessor and the CD digital processor;

a laser pick-up electrically connected to the high frequency amplifier, the laser pick-up sending data of the CD to the CD digital processor;

the digital audio signal processor including a dynamic RAM to store the data of the CD;

a digital/analog converter electrically connected to the digital audio signal processor for converting the digital data from the dynamic RAM into an analogue signal, which are then sent through a low pass filter and played as music; and, a turnable control element electrically connected to the microprocessor; the control element being provided with two separate wound wires on a surface thereof; the control element having a light sensitive device, which is electrically connected to the digital audio signal processor, and will sense rotating speed and direction of the control element;

and being characterized by a voltage dividing circuit consisting of both a first lead, and a second lead; the first lead being grounded at one end, and connected to one of the wires at other end; the second lead being connected to the other one of the wires at one end, and connected to an input end of an analog/digital converter at other end; the second lead being connected to both a positive pole of a direct current and a resistor, which is in parallel with the analog/digital converter; the analog/digital converter being connected to the microprocessor at an output end thereof;

the microprocessor deciding that users' hands have touched the control element to complete the voltage dividing circuit on detecting a voltage drop in order to make music played with direction and speed changing according to movement of the control element as sensed by means of the light sensitive device; music being played in an original way as soon as the hand is removed from the turnable control element for the circuit to become open for disappearance of the voltage drop.

* * * * *